United States Patent [19]
Pfeifer et al.

[11] 3,827,802
[45] Aug. 6, 1974

[54] MICROFILM CODING APPARATUS

[75] Inventors: Josef Pfeifer, Unterhaching; Wilfried Hofmann; Karl-Heinz Dietrich, both of Munich, all of Germany

[73] Assignee: AGFA-Gevaert Aktiengesellschaft, Leverkusen, Germany

[22] Filed: Feb. 7, 1973

[21] Appl. No.: 330,382

Related U.S. Application Data

[62] Division of Ser. No. 243,201, April 12, 1972, Pat. No. 3,750,553.

[30] Foreign Application Priority Data
Apr. 17, 1971  Germany.......................... 2118732
Dec. 4, 1971  Germany.......................... 2160211

[52] U.S. Cl..................... 355/41, 354/109, 354/33
[51] Int. Cl. ..................................... G03b 17/24
[58] Field of Search ............. 95/1.1; 355/64, 65, 50

[56] References Cited
UNITED STATES PATENTS
1,885,863  11/1932  Satterlee ............................... 95/1.1
1,919,957  7/1933  Lyman .................................. 355/64
2,194,808  3/1940  Pooley .................................. 355/50
2,292,825  8/1942  Dilks ..................................... 355/64
2,821,124  1/1958  Enright ................................. 95/1.1
3,069,682  12/1962  Reese ................................. 95/1.1 X
3,334,539  8/1967  Kleist ................................. 95/1.1 X
3,710,696  1/1973  Tucker ................................. 95/1.1

Primary Examiner—John M. Horan
Attorney, Agent, or Firm—Michael S. Striker

[57] ABSTRACT

A microfilming apparatus wherein one of two transparent plates which define the image plane for originals carries a row of enclosed electric lamps serving to encode information on microfilm during exposure of successive originals onto successive microfilm frames. The encoded information facilitates the finding of selected microfilm frames. The plates are movable from operative to exposed positions to be accessible for cleaning. The number and distribution of lamps which light up to encode information on microfilm is controlled by a programming unit which can be actuated by hand or automatically, either in response to detection of successive originals in the image plane or in response to detection of signal generating sheets which are fed into the image plane alternately with successive originals. A detector scans the thickness and/or the conductivity of signal generating sheets and causes the programming unit to change the number and/or distribution of lamps which are lighted simultaneously or substantially simultaneously with the exposure of successive originals onto the microfilm.

13 Claims, 6 Drawing Figures ing. The apparatus comprises means for placing sheets of
MICROFILM CODING APPARATUS

CROSS-REFERENCE TO RELATED APPLICATION

This application is a division of our application Ser. No. 243,201, filed Apr. 12, 1972 now U.S. Pat. No. 3,750,553 and entitled "Microfilm Coding Method and Apparatus."

BACKGROUND OF THE INVENTION

The present invention relates to microfilming apparatus in general, and more particularly to improvements in such apparatus for encoding indicia on microfilm simultaneously with exposure of successive originals onto recessive microfilm frames. Still more particularly, the invention relates to improvements in an apparatus for exposing on microfilm indicia which serve to facilitate rapid and convenient finding of selected microfilm frames for observation in a microfilm reading or microimage retrieving apparatus.

It is already known to provide a microfilm with characteristic indications which facilitate the finding of desired frames or groups of frames. As a rule, the indications are in the form of black lines or strips edge coding or line coding which are exposed onto microfilm between successive frames. The number and/or the distance of lines from a marginal portion or edge of the film is indicative of a particular microimage or of a particular group of microimages. The means for producing the lines includes white levers which are adjustable in or close to the image plane so as to provide a desired number of combinations. The levers must be moved by hand so as to be located at a desired distance from the edge of microfilm and/or from each other. The image of each lever appears as a black line or strip. The exposure of a selected group of levers to light takes place simultaneously with the exposure of the thus identified original or group of originals. The microfilm reading or microimage retrieving apparatus is provided with means for allowing an observation of the black lines or strips on microfilm to facilitate rapid placing of a selected frame or group of frames into a position for projection of the information onto a screen or the like.

A drawback of presently coding apparatus is that the aforementioned white levers are immediately adjacent to the image plane in which the originals are transported for the exposure of their images onto microfilm. The originals are guided between two light transmitting plates which are fixedly mounted in the housing of the apparatus. The levers and the plates are likely to be contaminated so that they require frequent inspection and cleaning. Such procedure is tedious and time-consuming because the guide plates and the levers are not readily accessible.

SUMMARY OF THE INVENTION

An object of the invention is to provide a novel and improved apparatus for encoding frame identifying indicia on microfilm.

Another object of the invention is to provide an apparatus by which the selection of the number and/or distribution of identifying indicia can be carried out manually or automatically.

A further object of the invention is to provide a novel and improved indicia applying or coding apparatus which dispenses with manually movable levers and affords convenient access to the parts which are likely to require frequent inspection due to contamination or for other reasons.

An additional object of the invention is to provide the apparatus with novel means for initiating the exposure of identifying indicia onto microfilm and with novel means for automatically changing the number and/or distribution or orientation of such indicia in response to completed exposure of successive originals or groups of originals onto microfilm.

Still another object of the invention is to provide the apparatus with novel means for mounting the guiding devices for originals.

A feature of the invention resides in the provision of an apparatus for coding microfilms simultaneously with exposure of originals onto successive microfilm frames. The apparatus comprises means for placing sheets of originals into an image plane alternately with second sheets which differ from the originals in at least one detectable characteristic, means for positioning a plurality of electric lamps or analogous light sources in the region of the image plane, means for scanning the image plane and generating signals (preferably electric signals) in response to detection of second sheets, and means for utilizing the thus generated signals to image onto microfilm different groups of light sources whereby the images of selected light sources constitute on the microfilm encoded information (which can be located in the frame lines between successive microfilm frames) identifying the images of originals adjacent to those second sheets whose detection triggered the generation of respective signals.

The detectable characteristics of the second sheets may be their thickness and/or their ability to conduct electric current.

The apparatus may further comprise means for stacking the original sheets and the second sheets so that the original sheets of the resulting stack alternate with second sheets, and means for feeding successive sheets of the stack into and advancing them in the image plane.

The signals may be produced in response to completion of an electric circuit by means of a selector switch having a preferably movable portion which extends into or is immediately adjacent to the image plane. The circuit may form part of a programming unit which automatically changes the number and/or distribution or sequence of those light sources which are to be imaged onto microfilm in response to generation of successive signals.

The light sources may be arranged in at least one row which preferably extends transversely of the direction of movement of original and second sheets in the image plane, and the light sources are preferably confined in a suitable enclosure to protect them against contamination by dust or other foreign matter.

The novel features which are considered as characteristic of the invention are set forth in particular in the appended claims. The improved coding apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
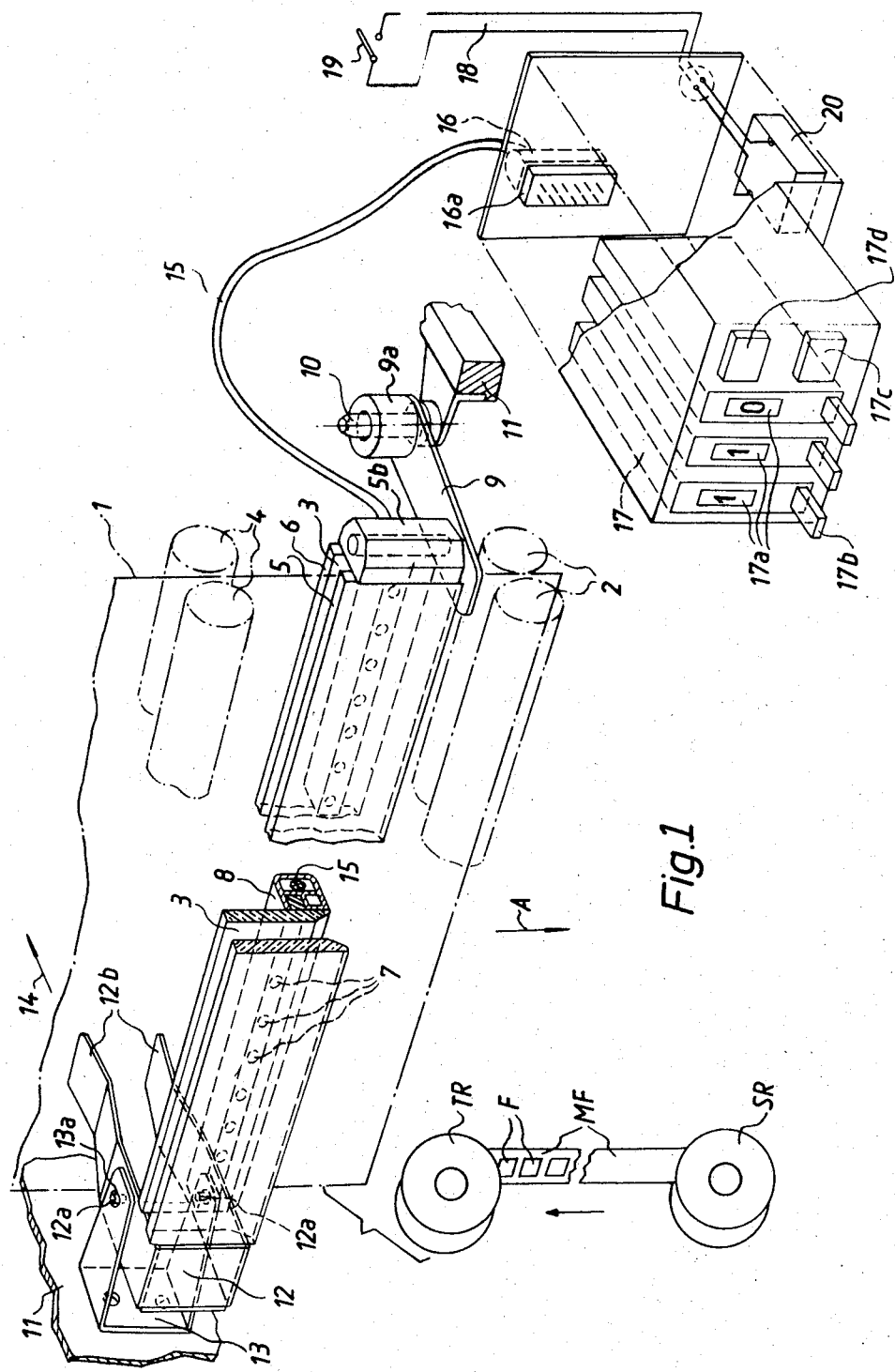
FIG. 1 is a fragmentary perspective view of a microfilm coding apparatus which embodies one form of the invention.

Referring first to FIG. 1, there is shown a portion of a microfilm coding apparatus which embodies one form of the invention. The apparatus comprises a housing 11 which accommodates a customary projection lens, a light source, a platform which maintains successive frames of microfilm MF in the focal plane of the lens and other customary components which are not shown in the drawing. The microfilm MF can be paid out by a supply reel SR and collected by a takeup reel TR so that a portion thereof extends across the optical axis of the lens and receives images of successive originals one of which is shown in FIG. 1, as at 1. This original is located in an image plane 3 extending between two light transmitting guide plates 5,6. The plates 5,6 extend transversely of the direction of transport (arrow A) of successive originals 1 in the image plane 3. The transporting mechanism for originals 1 comprises two driven advancing rolls 4 located at the opposite sides of the image plane 3 upstream of the guide plates 5,6, and two similarly mounted advancing rolls 2 located downstream of the guide plates.

The guide plate 6 carries an elongated casing or enclosure 8 for at least one row of light sources here shown as electric lamps 7. The lamps 7 are equidistant from each other and they serve to expose coding lines or strips on the microfilm MF. Such strips can be exposed on the frame lines between successive frames F of the microfilm MF. The circuit of one or more lamps 7 can be completed by a programming unit 17 and the images of selected lamps are encoded in the form of strips or lines on microfilm MF which moves in the focal plane of the lens. The selected lamp or lamps 7 will be imaged on microfilm MF only during the interval when they are not overlapped by an original 1. The exposed strips or lines are parallel to the edges of microfilm MF which latter moves in synchronism with the originals 1 in a manner well known in the art of continuous microfilming systems. The number of coding lines, their distance from each other and their distance from the edges of microfilm MF are indicative of the respective film frames.

The guide plates 5,6 are secured to each other at one end, as at 5b, and are mounted on a carrier lever 9 which is turnable on a shaft 10. The shaft 10 is located without the image plane 3 and is mounted in a portion of the housing 11. The other ends of the guide plates 5,6 are connected to each other by a U-shaped handle 12 having two elastic prongs or arms 12b and provided with a pair of coaxial detent pins 12a which can enter complementary recesses or openings 13a provided in the arms of a U-shaped bracket 13 which is mounted in the housing 11. Prior to pivoting of the guide plates 5,6 to an open or exposed position (arrow 14), the operator grips the prongs 12b of the handle 12 and moves the prongs toward each other to thereby withdraw the detent pins 12a from the respective openings 13a. The plates 5,6 are then free to turn about the axis of the shaft 10 to a position of accessibility for the purposes of inspection and/or cleaning. The lamps 7 are confined in their casing 8 so that they are protected from dust or other foreign matter. The conductors which serve to connect the lamps 7 with a source of electrical energy form a flexible cable 15 which extends lengthwise through the casing 8 and one end of which carries a plug 16 with a requisite number of male contacts which can engage female contacts in a socket 16a of the programming unit 17.

All details of the programming unit 17 form no part of the present invention. This unit comprises an assembly which can complete the circuits of lamps 7 in the casing 8 in a desired sequence so that each of a series of successively photographed originals 1 is identified by a different combination and/or different number of coding lines constituting the images of selected lamps 7. The unit 17 comprises adjustable decimal counters 17a which can complete the circuits of selected lamps 7. Each counter 17a has a window to expose a digit of a counter wheel and can be adjusted by a pushbutton 17b which can be depressed by hand to select the observable digit and to thus determine the number and/or distribution of lamps 7 whose circuits are about to be completed. The illustrated programming unit 17 with three adjustable counter wheels can select different groups of one, two or three lamps 7 which, with a total number of, for example, thirty lamps in the casing 8, can provide an extremely large number of different combinations of coding lines.

A sequence selecting pushbutton 17c of the programming unit 17 is actuatable by hand to adjust the counters 17a in a predetermined sequence without necessitating any actuation of the individual pushbuttons 17b. Thus, all the operator has to do is to press the button 17c upon completed imaging of an original 1 whereby the programming unit 17 automatically selects the next one of a predetermined sequence of lamp groupings. The pushbutton 17c controls a sequence selector switch which is connected in parallel with a normally open auxiliary sequence selector switch 19 by means of a flexible remote control cable 18. The switch 19 can be closed by hand, by a foot pedal or automatically in response to completed transport of an original 1 beyond the advancing rolls 2. For example, the coding apparatus may be equipped with a conventional photoelectric detector (not shown) which scans the path of originals 1 in the image plane 3 and automatically closes the switch 19 (or the switch which is actuated by the pushbutton 17c) in response to detection or completed passage of an original.

The casing of the programming unit 17 further contains a signal generating device 20 which produces a visible or audible signal in response to actuation of the pushbutton 17c or auxiliary selector switch 19 to thus inform the operator that the selection of a different group of lamps 7 has been completed. The signal generating device 20 can also serve to warn the operator that a new lamp selection must take place prior to transport of the next original 1 past the optical system.

A further switch 17d serves to activate or deactivate the entire programming unit 17. The latter is preferably mounted in or on or adjacent to the housing 11 so as to be readily accessible to the operator.

It is clear that the microfilm coding apparatus of FIG. 1 is susceptible of many additional modifications. For example, the programming unit 17 can be used in a duplex microfiling apparatus. Furthermore, the guide plates 5,6 can be mounted on the member 5b and/or on the handle 12 for pivotal movement with respect to each other. Still further, the axis of the shaft 10 can be placed into the image plane 3 provided that the plates 5,6 are still movable between the illustrated operative positions and exposed positions in which they can be readily inspected and/or cleaned, i.e., that such movements of the plates are not impeded by the advancing elements 2,4 and/or other components of the apparatus. The arrangement is preferably such that the parts 5, 6, 5b, 9 and a sleeve 9a of the part 9 can be lifted off the shaft 10 after the plates 5,6 are moved to their exposed positions. This allows for rapid replacement of the entire assembly including the parts 5–9, 9a, 12, 15, 16, 5b with a similar assembly. The lamps 7 can be replaced with other types of encoding means as long as the selected encoding means are capable of coding the microfilm in a readily detectable manner and in such a way that the encoded information can be readily discerned and processed for rapid selection of a desired microfilm frame F.

The auxiliary switch 19 can be connected in parallel with one or more additional auxiliary sequence selector switches which are suitably distributed so that the selection of successive groups of lamps 7 can be made at any one of several locations. As stated before, the shifting to sucessive combinations of lamps 7 can be effected automatically by resorting to a photosensitive detector which scans the image plane 3 for the presence or absence of the originals 1. Also, the coding apparatus can be equipped with an electronic detector system which monitors the originals for the presence of special markers serving to trigger a change in the setting of counters 17a in the same way as if the operator were to actuate the pushbutton 17c or auxiliary switch 19.

If several originals 1 are assembled into groups which are exposed onto successive frames of a roll of microfilm, each such group of originals can be identified by a single set of coding lines. If the groups of originals or discrete originals are properly stacked or otherwise prepared for transport past the optical system in a predetermined sequence, the operator will actuate the pushbutton 17c or the switch 19. The pushbuttons 17b serve to select any desired grouping of lamps 7 for any desired original. The main purpose of the signal generating device 20 is to insure that the operator will not repeatedly actuate the pushbutton 17c or the switch 19 prior to introduction of the next original switch 19 of the next original or group of originals into the image plane. This could result in improper coding of successive microfilm frames.

The casing 8 can accommodate two or more rows of electric lamps 7 or analogous light sources. If the lamps 7 form two or more rows, the lamps of each row may be staggered with respect to the lamps of the other row or rows.

Figure 2:
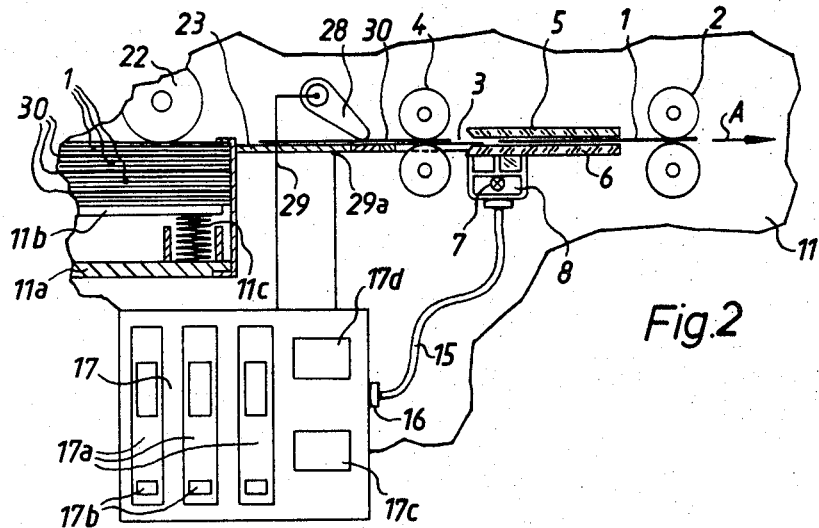
FIG. 2 is a fragmentary vertical sectional view of a second apparatus.
Figure 3:
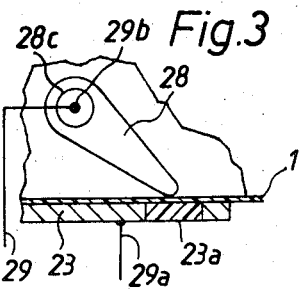
FIG. 3 is an enlarged view of a detail in FIG. 2, showing a selector switch in the open position.
Figure 4:
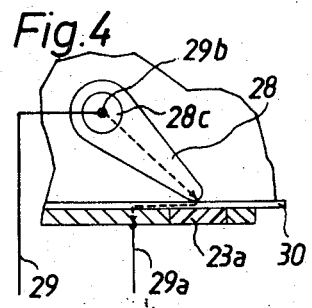
FIG. 4 illustrates the structure of FIG. 3 but with the selector switch in closed position.

FIGS. 2 to 4 illustrate a portion of a second microfilm coding apparatus wherein all such parts which are clearly analogous to or identical with the corresponding parts of the first apparatus are denoted by similar reference characters. The housing 11 accommodates a receptacle or tray 11a for a stack of originals 1 which alternate with signal generating sheets 30 of conductive material. A platform 11b in the tray 11a is biased upwardly by helical springs 11c so that the uppermost original 1 or sheet 30 bears against the periphery of an elastic feeding roll 22 which is driven continuously or intermittently to introduce successive originals 1 and sheets 30 into the image plane 3. Such image plane is adjacent to the upper side of a table 23 which guides successive originals 1 and sheets 30 into the nip between the advancing rolls 4. From there on, such originals and sheets advance through the gap between the guide plates 5,6 (above the casing 8 for the lamps 7) and into the range of advancing rolls 2 which transport the originals and sheets to a further destination (arrow A). The casing 8 extends transversely of the direction of movement of originals 1 and sheets 30 in the image plane 3. The manner in which the programming unit 17 can complete the circuits of selected lamps 7 in a given sequence or at the will of the operator (see the pushbuttons 17b) is the same as described in connection with FIG. 1.

The apparatus of FIGS. 2 to 4 comprises a modified sequence selector switch which replaces the auxiliary switch 19 of FIG. 1. The modified selector switch comprises a fixed contact which constitutes the table 23 and a movable contact 28 here shown as a lever which is mounted in the housing 11 on a pivot pin 28c. The movable contact or lever 28 is connected with the programming unit 17 by a first conductor 29 which is soldered to the pivot pin 28c, as at 29b, and the table 23 is connected with the unit 17 by a second conductor 29a. Thus, the switch including the parts 23 and 28 can complete an electric circuit when the current is free to flow between the tip of the lever 28 and the table 23. In order to prevent the closing of this switch when the table 23 does not support a sheet 30, the table 23 is provided with an insert 23a of insulating material which is contacted by the lever 28 in the absence of a sheet 30 or an original 1 on the table. The originals 1 are not conductive so that the switch 23, 28 cannot complete an electric circuit of the programming unit 17 when the table 23 supports an original. However, the sheets 30 conduct current and, therefore, whenever a sheet 30 moves into the space below the tip of the lever 28, current can flow between the conductors 29, 29a and the programming unit 17 automatically changes the grouping of lamps 7 which are to be imated onto microfilm in conjunction with the next-following original 1. The table 23 may consist of sheet metal and at least a portion of the pin 28c conducts current so that the lever 28 is electrically connected with the programming unit 17 by way of the conductor 29.

It will be noted that the selector switch including the parts 23, 28 will complete a circuit in the programming unit whenever the feeding roll 22 introduced a signal generating sheet 30 into the nip between the advancing rolls 4. FIG. 3 shows the selector switch 23, 28 in inoperative position because the table 23 supports an original 1. In FIG. 4, the selector switch is closed because a sheet 30 on the table 23 contacts the lever 28.

Figure 5:
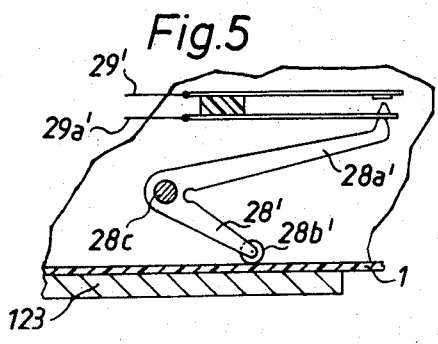
FIG. 5 illustrates a modified selector switch in open position.
Figure 6:
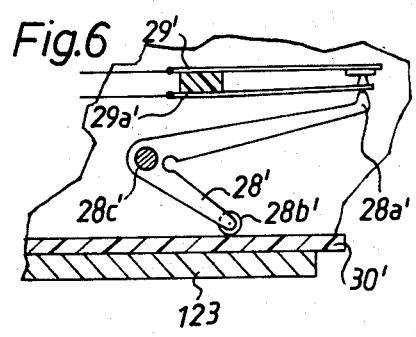
FIG. 6 illustrates the selector switch of FIG. 5 in closed position.

FIGS. 5 and 6 illustrate a portion of an apparatus with a selector switch which constitutes a modification of the switch 23, 28 shown in FIGS. 3 and 4. The stack on the platform 11a (not shown in FIGS. 5 and 6) consists of alternating information-bearing originals 1 and relatively thick signal generating sheets 30' whose thickness may be a multiple of the thickness of a sheet 30 or an original 1. The modified selector switch comprises a first elastic contact 29' which corresponds to the conductor 29a of FIGS. 2–4, a second elastic contact 29a' which corresponds to the conductor 29 of FIGS. 2–4, and a two-armed lever 28' which is pivotable on a pin 28c' and need not be made of current-conducting material. The lower arm of the lever 28' carries a roller follower 28b' which is biased against the upper side of a non-conductive table 123 by the elastic contact 29a' and/or by a discrete spring (not shown). The other arm 28a' of the lever 28' is adjacent to the contact 29a' and can move this contact against the contact 29' in response to travel of sheet 30' along the upper side of the table 123 (see FIG. 6). When the roller follower 28b' abuts against the table 123 or against an original 1 (see FIG. 5), the arm 28a' cannot close the contacts 29', 29a' so that the programming unit 17 receives an impulse to change the grouping of lamps 7 only when the roller follower 28b' engages a sheet 30'. An advantage of the apparatus whose parts are shown in FIGS. 5–6 is that accidental closing of the selector switch 29', 29a', 28' is much less likely than in the apparatus of FIGS. 2–4 and that the sheets 30' need not consist of current-conducting material. An advantage of the apparatus of FIGS. 2–4 is that a full stack on the platform 11a in the housing 11 can comprise a large number of originals 1 because the thickness of signal generating sheets 30 need not exceed and can be less than that of the originals 1. The sheets 30 may consist of metallic foil.

It is clear that the lower arm of the lever 28' can be suitably rounded so that the roller follower 28b' can be dispensed with. It is also possible to mount a roller follower on the lever 28 of FIGS. 2–4, provided that the roller follower can conduct current between a sheet 30 and the lever 8.

The selector switch need not be mounted upstream of the advancing rolls 4. For example, at least certain parts of such selector switch can be mounted between the rolls 4 and the guide plates 5,6 immediately behind the guide plates 5,6 or even behind the advancing rolls 2. Furthermore, the coding apparatus can employ other types of selector switches which are actuatable as a function of the conductivity, thickness and/or other detectable characteristics of the material which is being transported in the image plane. The apparatus of FIGS. 2–4 or 5–6 can be simplified if the originals 1 and sheets 30 or 30' are fed by hand. However, the automatic feeding of such sheet-like material has been found to result in substantial savings in time and is more reliable than if the control of the selector switch or switches is entrusted to the attendants. Furthermore, a single attendant can service two or more microfilm coding apparatus since all that is necessary is to insure that each apparatus contains a supply of microfilm and a stack of alternating originals 1 and sheets 30 or 30'. It is also within the purview of the invention to mount the selector switches of FIGS. 3–4 and 5–6 in a single apparatus whereby the switch of FIGS. 3–4 is inactive when the stack on the platform 11a contains sheets 30' (which need not be conductive), and the switch of FIGS. 5–6 is inactive when the stack contains sheets 30 (whose thickness need not exceed the thickness of an original). Finally, it is also possible to modify the selector switch of FIGS. 5–6 in such a way that it completes a circuit in response to detection of sheets whose thickness is less than the thickness of an original.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. Apparatus for coding microfilm simultaneously with exposure of sheet-like originals onto successive microfilm frames, comprising a housing; guide means in said housing and defining an image plane for successive originals, said guide means comprising two parallel light transmitting plates normally located at the opposite sides of said image plane; a plurality of light sources provided in the region of said image plane and operable to emit light and to be thereby imaged on microfilm whereby the images of operated light sources constitute on microfilm encoded information identifying the adjacent images of originals, said light sources being mounted on one of said plates and further comprising pivot means provided in said housing and supporting said plates for pivotal movement between operative positions in which said plates are located at the opposite sides of said image plane and second positions in which said plates and said light sources are readily accessible; and programming means actuatable to select the light sources which are operated to identify the images of successive originals.

2. Apparatus as defined in claim 1, wherein said light sources are electric lamps and further comprising flexible cable means including conductor means connecting said lamps with said programming means.

3. Apparatus as defined in claim 1, further comprising cooperating detent means provided in said housing and on said light transmitting plates for releasably holding the latter in said operative positions thereof.

4. Apparatus as defined in claim 1, wherein said pivot means defines for said plates a pivot axis which is laterally adjacent to and located without said image plane, said plates having handle means remote from said pivot means and said housing and said handle means being provided with cooperating detent means for releasably holding said plates in said operative positions.

5. Apparatus as defined in claim 1, wherein said programming means comprises a plurality of counter means adjustable to select different light sources to be operated in response to actuation of said programming means.

6. Apparatus as defined in claim 5, further comprising manually operated means for adjusting said counter means.

7. Apparatus as defined in claim 5, further comprising selector switch means for adjusting said counter means.

8. Apparatus as defined in claim 7, further comprising manually operable means for rotating said selector switch means.

9. Apparatus as defined in claim 7, further comprising cable means connecting said selector switch means with said counter means.

10. Apparatus as defined in claim 9, wherein said selector switch means is operable by hand.

11. Apparatus as defined in claim 5, further comprising detector means arranged to scan said image plane for the presence of originals and to adjust said counter means in response to detection of successive originals.

12. Apparatus as defined in claim 11, wherein said detector means comprises at least one photosensitive detector.

13. Apparatus as defined in claim 5, wherein said programming means further comprises signal generating means arranged to produce a detectable signal in response to each adjustment of said counter means.

* * * * *